(12) United States Patent
Vick, Jr. et al.

(10) Patent No.: US 11,708,739 B2
(45) Date of Patent: *Jul. 25, 2023

(54) 3D PRINTED TOOL WITH INTEGRAL STRESS CONCENTRATION ZONE

(71) Applicant: Halliburton Energy Services, Inc., Houston, TX (US)

(72) Inventors: James Dan Vick, Jr., Dallas, TX (US); Kevin Robin Passmore, McKinney, TX (US); Shaun Wen Jie Ng, Singapore (SG); Robert Arthur Rademaker, The Colony, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/177,313

(22) Filed: Feb. 17, 2021

(65) Prior Publication Data
US 2021/0164319 A1 Jun. 3, 2021

Related U.S. Application Data

(62) Division of application No. 16/072,611, filed as application No. PCT/US2016/022268 on Mar. 14, 2016, now Pat. No. 10,954,743.

(51) Int. Cl.
*E21B 33/129* (2006.01)
*B25J 9/16* (2006.01)
*B33Y 80/00* (2015.01)

(52) U.S. Cl.
CPC ........ *E21B 33/1292* (2013.01); *E21B 33/129* (2013.01); *B25J 9/16* (2013.01); *B33Y 80/00* (2014.12)

(58) Field of Classification Search
CPC .............. E21B 33/129; E21B 33/1292; B33Y 80/00; B25J 9/16
See application file for complete search history.

(56) References Cited

U.S. PATENT DOCUMENTS

| 3,456,726 A | 7/1969 | Barrington et al. |
| 3,891,033 A | 6/1975 | Scott |
| 5,839,866 A | 11/1998 | Moen et al. |
| 6,334,488 B1 | 1/2002 | Freiheit |
| 7,735,578 B2 | 6/2010 | Loehr et al. |
| 10,954,743 B2 * | 3/2021 | Vick, Jr. ............... E21B 33/129 |
| 2006/0266527 A1 | 11/2006 | Brisco et al. |

(Continued)

FOREIGN PATENT DOCUMENTS

WO    WO 2012/071449 A2    5/2012

OTHER PUBLICATIONS

International Search Report and The Written Opinion of the International Search Authority, or the Declaration, dated Dec. 13, 2016, PCT/US2016/022268, 17 pages, ISA/KR.

*Primary Examiner* — Yong-Suk (Philip) Ro
(74) *Attorney, Agent, or Firm* — Scott Richardson; Parker Justiss, P.C.

(57) ABSTRACT

A subsurface tool adapted to extend within a wellbore includes an integrally formed single-component body that defines an external surface and an internal chamber isolated from the external surface. When the tool is subjected to one or more stresses, a stress concentration is created within a stress zone of the single-component body, the stress zone being adjacent the internal chamber.

10 Claims, 13 Drawing Sheets

(56) References Cited

U.S. PATENT DOCUMENTS

2013/0037259 A1 2/2013 Cavender et al.
2013/0310961 A1 11/2013 Velez
2015/0275604 A1 10/2015 Norrie et al.

* cited by examiner

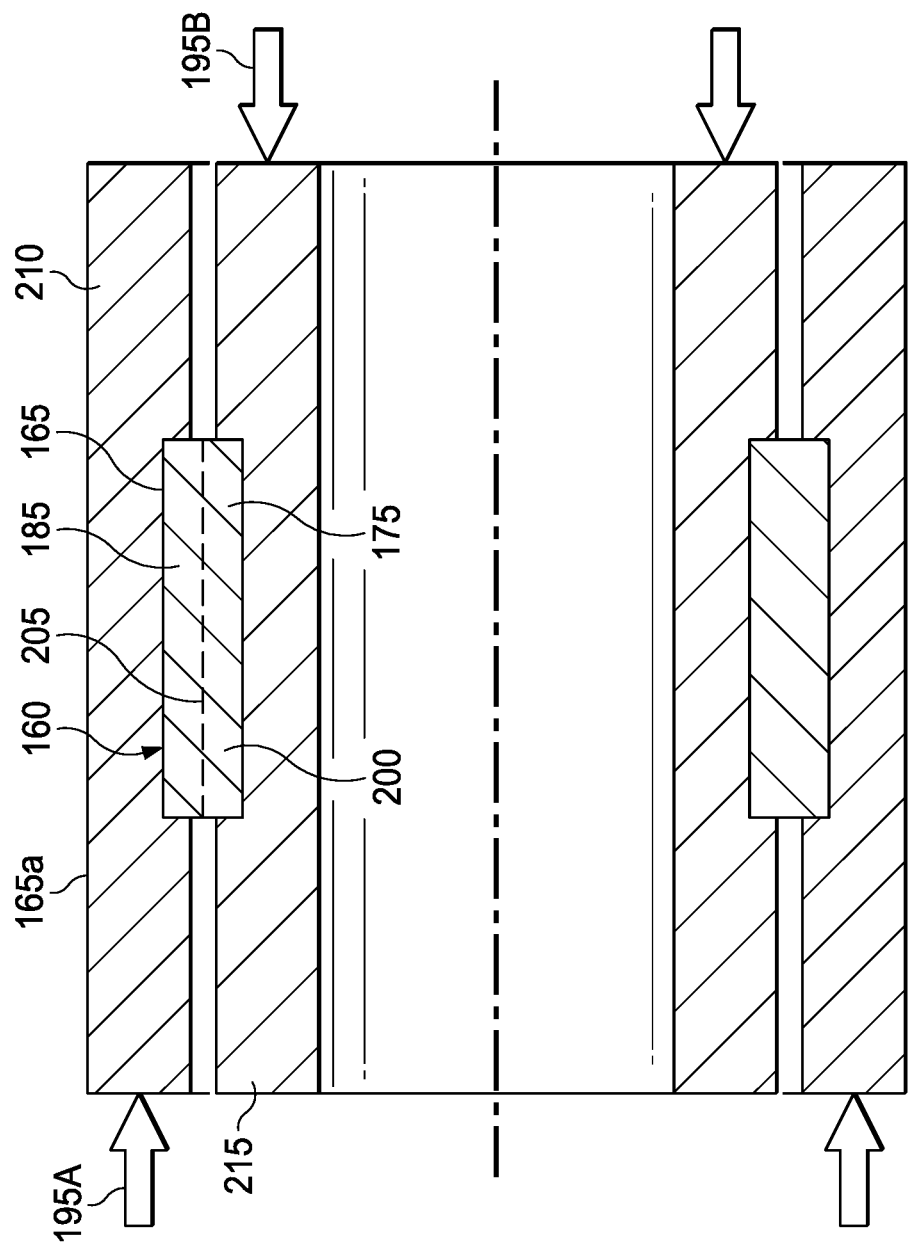

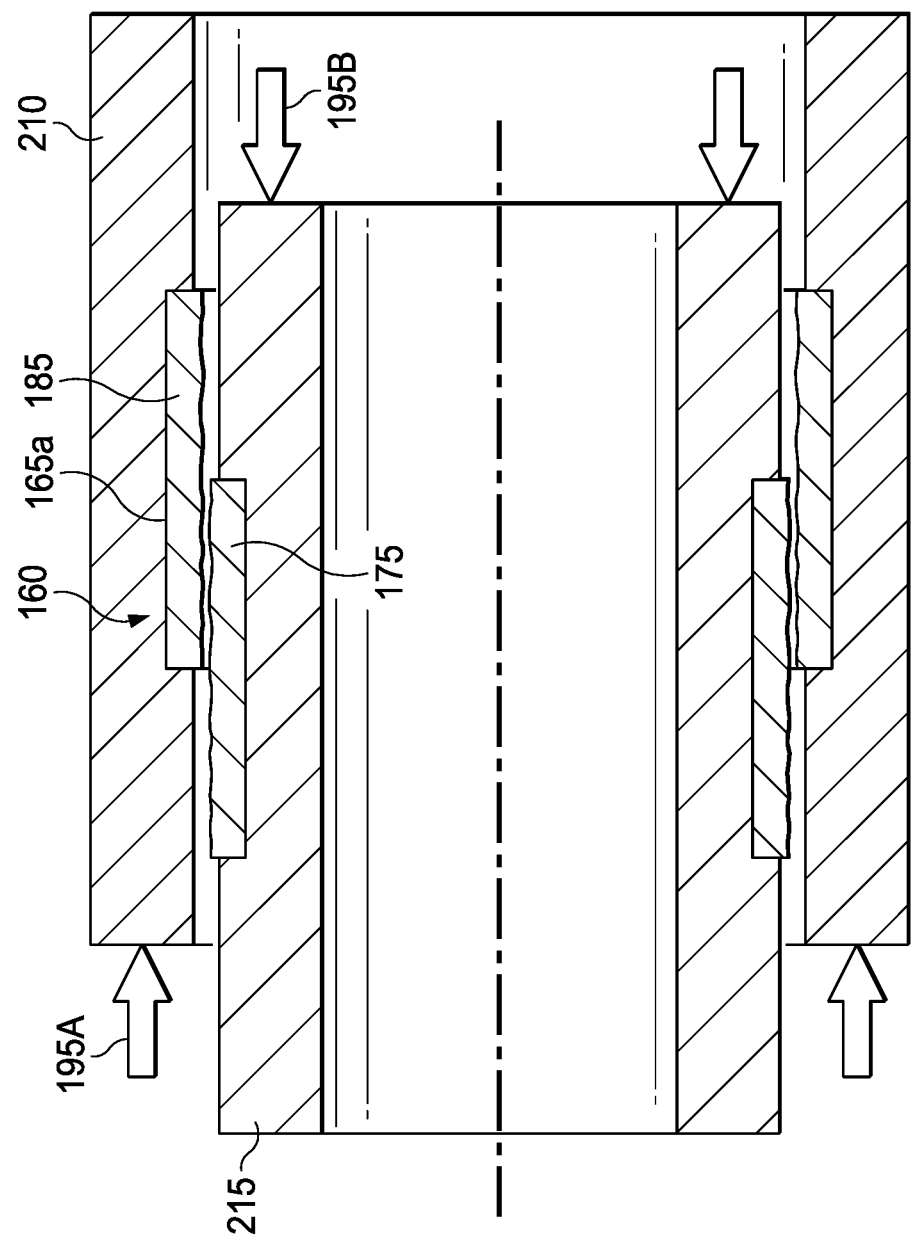

3D PRINTED TOOL WITH INTEGRAL STRESS CONCENTRATION ZONE

PRIORITY

The present application is a Divisional patent application of U.S. patent application Ser. No. 16/072,611, filed on Jul. 25, 2018, which is a U.S. National Stage patent application of International Patent Application No. PCT/US2016/022268, filed on Mar. 14, 2016, the benefit of which is claimed and the disclosure of which is incorporated herein by reference in its entirety.

TECHNICAL FIELD

The present disclosure relates generally to subsurface equipment that is at least partially manufactured using additive manufacturing, such as 3D printing, and more specifically, to a printed tool having an integral stress concentration zone.

BACKGROUND

Often, one portion of a subsurface tool is designed to separate from another portion of the subsurface tool when a predetermined force, such as a shear force or tensile force, is applied to the tool when the tool is down-hole. This separation allows for relative movement between the two portions. Whether the tool is a single-component tool or a multi-component tool, the predetermined force to separate the portions of the tool is generally proportional to an outer dimension of the tool. It is often desired to separate the portions of the tool with a force that is less than the predetermined force without otherwise affecting the performance and operation of the tool. Additionally, it is generally desired to reduce the number of components in the subsurface tool.

The present disclosure is directed to printed subsurface equipment, such as a printed tool having an integral stress concentration zone.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

FIG. 5A is a sectional view of the shear sleeve of FIG. 4 in a first configuration, according to an exemplary embodiment of the present disclosure;

FIG. 5B is a sectional view of the shear sleeve of FIG. 4 in a second configuration, according to an exemplary embodiment of the present disclosure;

DETAILED DESCRIPTION

Figure 1:
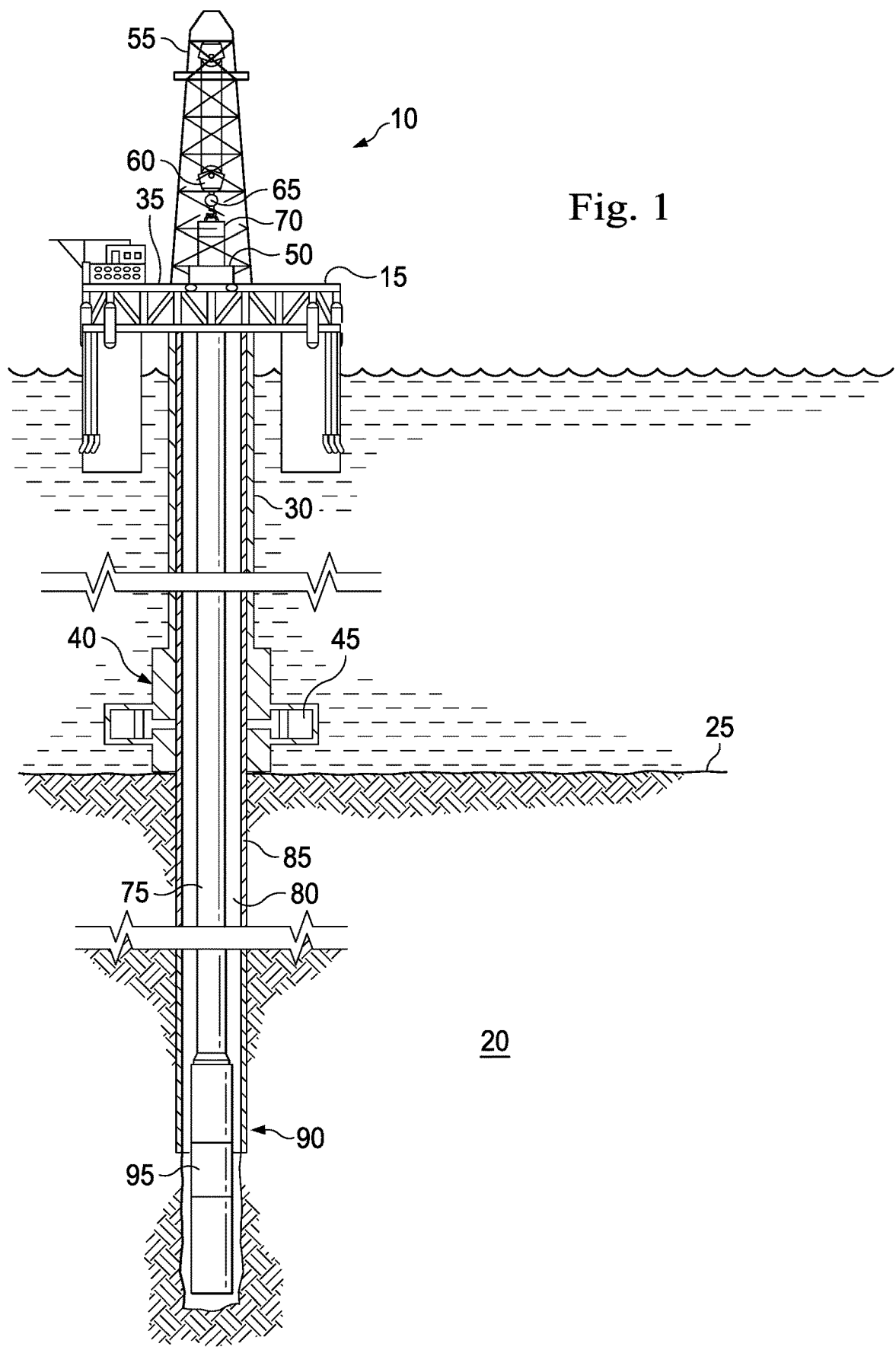
FIG. 1 is a schematic illustration of an offshore oil or gas production platform operating a printed tool with an integral stress concentration zone, according to an exemplary embodiment of the present disclosure.

Illustrative embodiments and related methods of the present disclosure are described below as they might be employed in a printed tool with an integral stress concentration zone and method of operating the same. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

The foregoing disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper," "uphole," "downhole," "upstream," "downstream," and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures. For example, if the apparatus in the figures is turned over, elements described as being "below" or "beneath" other elements or features would then be oriented "above" the other elements or features. Thus, the exemplary term "below" may encompass both an orientation of above and below. The apparatus may be otherwise oriented (rotated 90 degrees or at other orientations) and the spatially relative descriptors used herein may likewise be interpreted accordingly.

FIG. 1 is a schematic illustration of an offshore oil and gas platform generally designated 10, operably coupled by way of example to a printed tool having an integral stress concentration zone according to the present disclosure. Such an assembly could alternatively be coupled to a semi-sub or a drill ship as well. Also, even though FIG. 1 depicts an offshore operation, it should be understood by those skilled in the art that the apparatus according to the present disclosure is equally well suited for use in onshore operations. By way of convention in the following discussion, though FIG. 1 depicts a vertical wellbore, it should be understood by those skilled in the art that the apparatus according to the present disclosure is equally well suited for use in wellbores having other orientations including horizontal wellbores, slanted wellbores, multilateral wellbores or the like.

Referring still to the offshore oil and gas platform example of FIG. 1, a semi-submersible platform 15 may be positioned over a submerged oil and gas formation 20 located below a sea floor 25. A subsea conduit 30 may extend from a deck 35 of the platform 15 to a subsea wellhead installation 40, including blowout preventers 45. The platform 15 may have a hoisting apparatus 50, a derrick 55, a travel block 60, a hook 65, and a swivel 70 for raising and lowering pipe strings, such as a substantially tubular, axially extending tubing string 75. As in the present example embodiment of FIG. 1, a wellbore 80 extends through the various earth strata including the formation 20, with a portion of the wellbore 80 having a casing string 85 cemented therein. Disposed in the wellbore 80 is a completion assembly 90. Generally, the assembly 90 may be any one or more completion assemblies, such as for example a hydraulic fracturing assembly, a gravel packing assembly, etc. The assembly 90 may be coupled to the tubing string 75 and may include the printed downhole tool 95 (shown in greater detail in FIG. 2)

Figure 2:
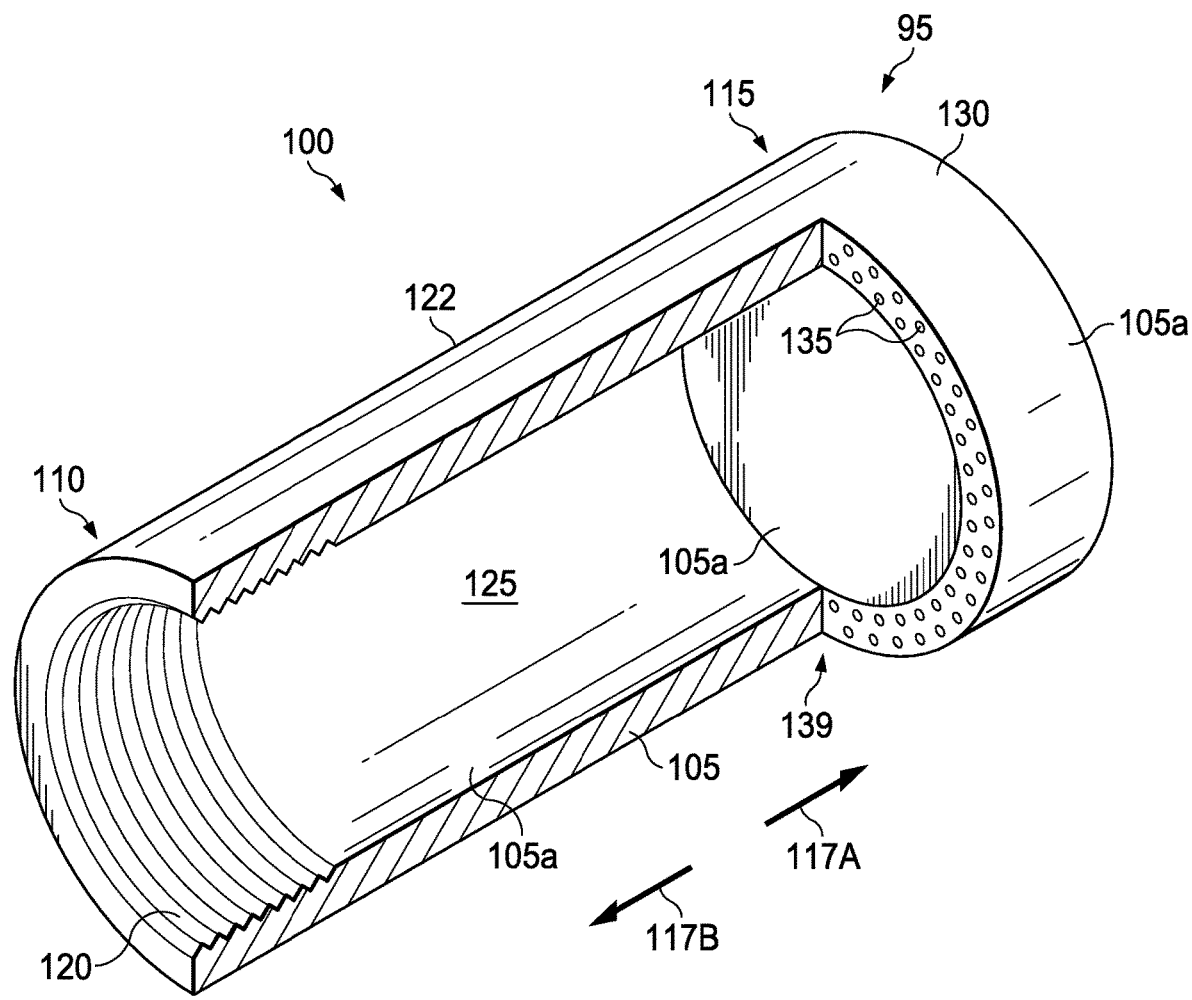
FIG. 2 is a perspective view of a partial cut-out of the tool of FIG. 1 when the tool is a plug, according to an exemplary embodiment of the present disclosure.

FIG. 2 illustrates a perspective view of a cut-out of the tool 95 when the tool is a plug 100. The plug 100 may be coupled to any one of a variety of downhole tools that form a portion of the tubing string 75, such as a packer, a seal bore extension, a mill-out extension or tailpipe. Regardless, the plug 100 is formed from an integrally formed single-component body 105 having a top portion 110 and an opposing bottom portion 115 in an axial direction indicated by the numeral 117A or an opposing axial direction indicated by the numeral 117B in the FIG. 2. The top portion 110 has a coupler 120 that couples the plug to the tubing string 75. For example, the coupler 120 is internally formed threads, but may be externally formed threads, pins, or any other similar coupler suitable for attaching the plug 100 to the tubing string 75. Generally, the top portion 110 forms a tubular 122 that defines an interior passageway 125. The bottom portion 115 includes a cap 130 that extends across the interior passageway 125 to block the interior passageway 125. In an exemplary embodiment, a plurality of chambers 135 is formed within the body 105 at an interface 139 of the cap 130 and the tubular 122. In an exemplary embodiment, the interface 139 is a zone of the body 105 that is adjacent at least one internal chamber of the plurality of internal chambers 135. In an exemplary the plurality of chambers 135 creates a stress concentration zone in the body 105 at the interface 139 when a plug 100 is subjected to one or more stresses.

Figure 3A:
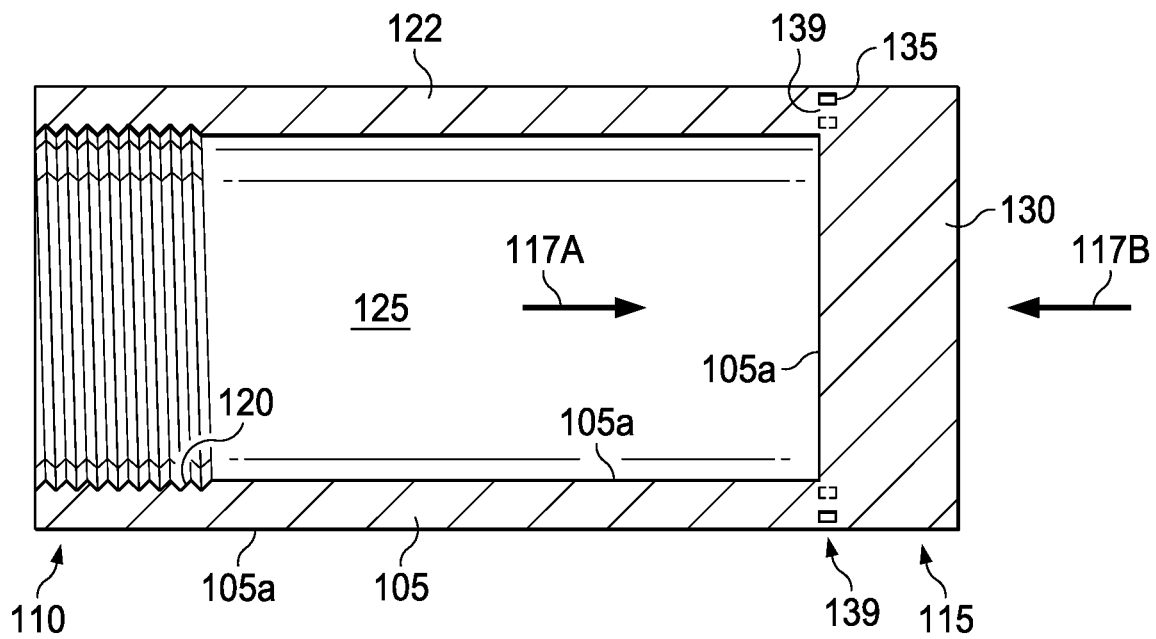
FIG. 3A is a sectional view of the plug of FIG. 2 in a first configuration, according to an exemplary embodiment of the present disclosure.

FIG. 3A illustrates the plug 100 in a run-in or first configuration, in which the body 105 is integrally formed such that the cap 130 is integrally formed to the tubular 122 to block the interior passageway 125. In the first configuration, the plug 100 is capable of withstanding a first predetermined range of forces to the end cap 130 in the direction 117B, which places the body 105 of the plug 100 under compressive stress. In an exemplary embodiment, the first predetermined range of forces may be applied via hydraulically or mechanically. Additionally, the plug 100 is capable of withstanding a second predetermined range of forces applied to the end cap 130 in the direction 117A, which places the body 105 of the plug 100 in tensile stress. Thus, the plug 100 is a bi-directional pressure plug that prevents bi-directional flow while in the first configuration. Additionally, as the body 105 forms both the tubular 122 and the end cap 130, the plug 100 is a single component bi-direction pressure plug.

Figure 3B:
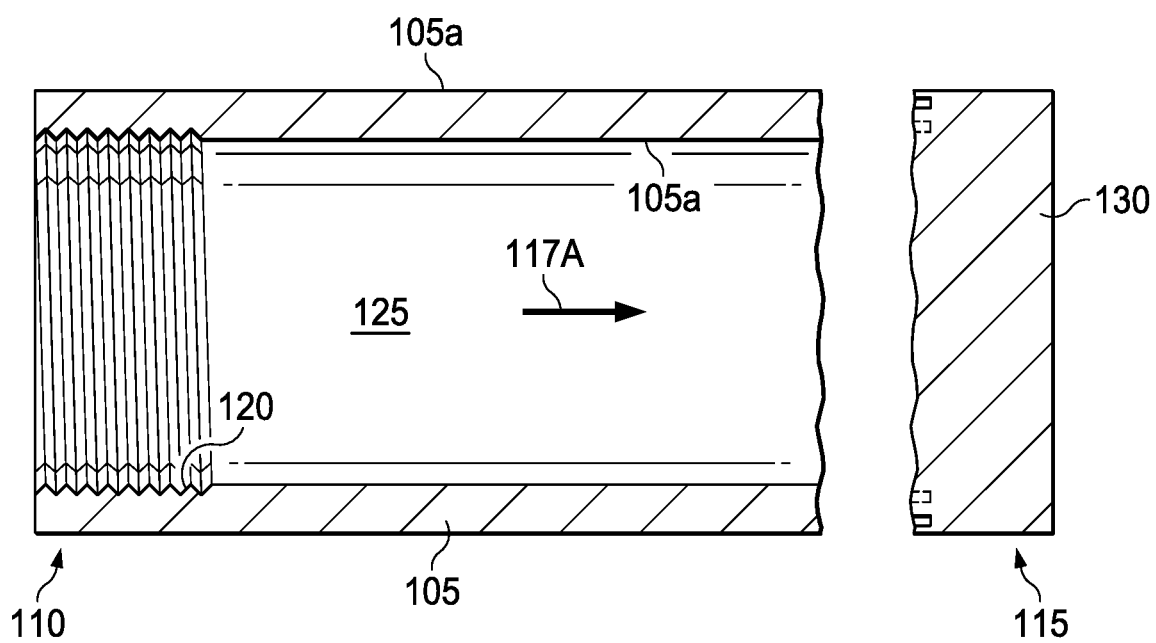
FIG. 3B is a sectional view of the plug of FIG. 2 in a second configuration, according to an exemplary embodiment of the present disclosure.

FIG. 3B illustrates the plug 100 in an actuated or second configuration, in which the end cap 130 is detached from the tubular 122. In an exemplary embodiment, and when a force is applied in the direction 117A that exceeds the second predetermined range of forces, the end cap 130 is separated from the tubular 122 along the interface 139. That is, when a force is applied in the direction 117A that results in tensile stress occurring in the interface 139 that exceeds a fracture strength or breaking strength of the material forming the body 105, then the end cap 130 breaks away from the tubular 122 to allow a fluid to flow through the fluid passage 125.

Figure 4:
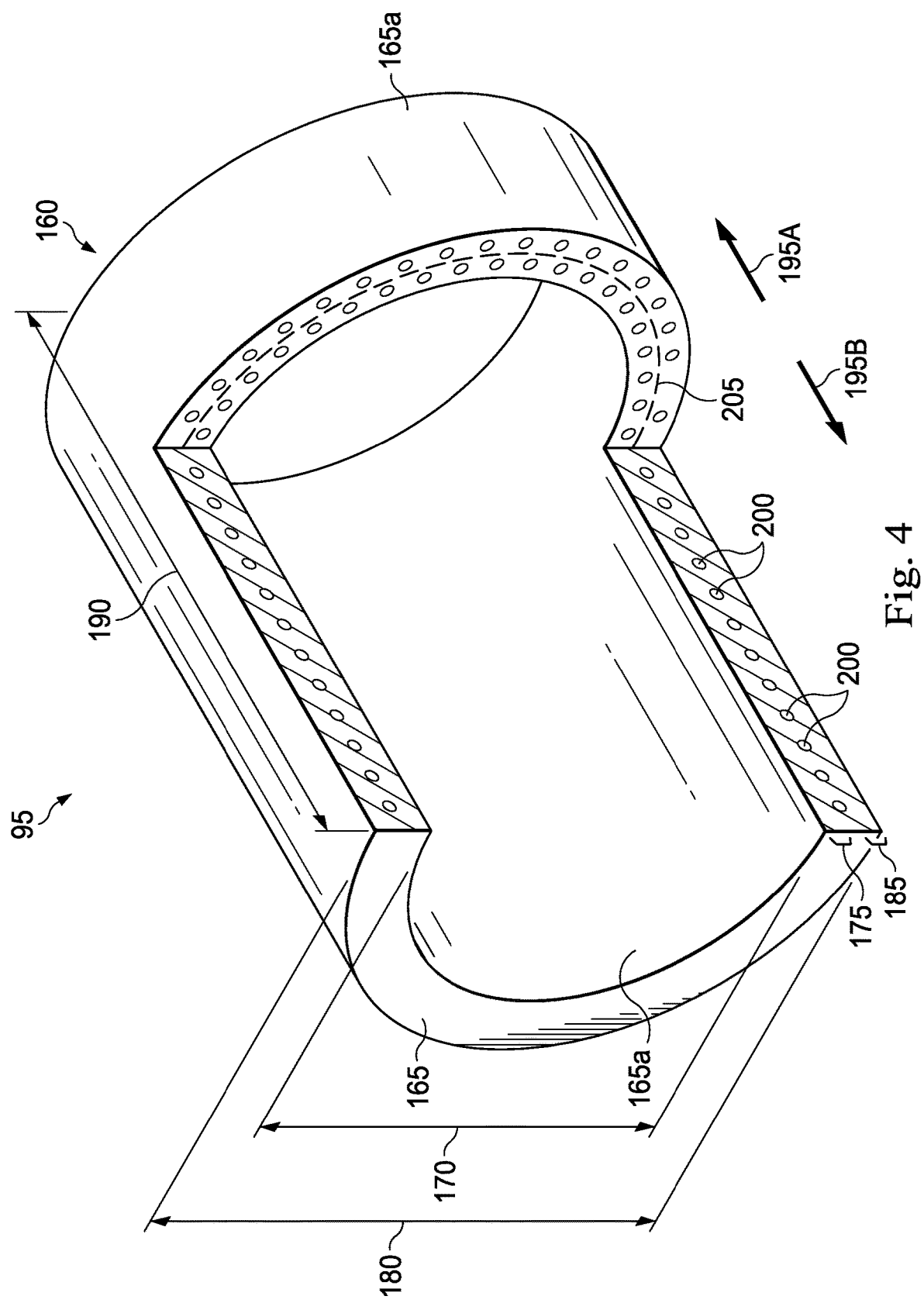
FIG. 4 is a perspective view of a partial cut-out view of the tool of FIG. 1 when the tool is a shear sleeve, according to an exemplary embodiment of the present disclosure.

In one or more exemplary embodiments, at least one chamber within the plurality of chambers 135 is an internal chamber. In one or more exemplary embodiments, an internal chamber is a chamber that is spaced from an external surface 105a of the body 105 or is a chamber that does not penetrate the external surface 105a. In one or more exemplary embodiments, the chambers from the plurality of chambers 135 are radially spaced and/or axially spaced along the interface 139. In one or more exemplary embodiments, the spacing of chambers from the plurality of chambers 135 in the radial and axial directions forms a chamber array. In one or more exemplary embodiments, each chambers from the plurality of chambers 135 may be a variety of shapes, such as a spherical, a cone, a pyramid, a cube, a cylinder, etc. In one or more exemplary embodiments, the chambers from the plurality of chambers 135 may be spaced in a variety of arrays to form an integrally formed single-component pump-out plug 100. A portion of the pump-out plug 100 is "weakened" along the shear zone 139 using the plurality of chambers 135. In one or more exemplary embodiments, the density of the chambers 135 within the interface 139 may be uniform or gradient. In one or more exemplary embodiments, each of the chambers in the plurality of chambers 135 is of engineered size distribution and chamber density distribution. In one or more exemplary embodiments, the plurality of chambers 135 is pre-determined by numerical analysis and do not detract from mechanical strength performance of the pump-out plug 100 when the pump-out plug 100 is in an axially compressed state. However, the plurality of chambers 135 is pre-determined by numeral analysis and does weaken the pump-out plus 100 such that when the pump-out plug 100 is in an axially tensile state, the cap 130 will detach from the tubular 122. In an exemplary embodiment, the body 100 is a fused body formed from a fused material and the chambers from the plurality of chambers 135 are un-fused areas. In an exemplary embodiment, the chambers from the plurality of chambers 135 contain an un-fused material (they are not completely hollow). In an exemplary embodiment, the shear strength of the plug 100 is dependent upon a sectional area of an internal chamber or the sum of the sectional areas of the plurality of chambers 135 along a cylindric section, or a portion of a cylindric section, within the stress zone, or along the interface 139. FIG. 4 illustrates a perspective view of a partial cut-out of the tool 95 when the tool 95 is a shear annular element, such as a shear ring or a shear sleeve 160. The shear sleeve 160 is formed from an integrally formed, single-component body 165 that has an inner diameter 170 that at least partially defines an inner radial portion 175; outer diameter 180 that at least partially defines an outer radial portion 185; and an axial length 190 defined in an axial direction indicated by the numeral 195A or an opposing axial direction indicated by the numeral 195B in the FIG. 4. In an exemplary embodiment, a plurality of interior chambers 200 are formed within the body 165 at an interface 205 of the inner portion 175 and the outer portion 185. In an exemplary embodiment, the interface 205 is a zone of the body 165 that is adjacent at least one internal chamber of the plurality of internal chambers 200. In an exemplary the plurality of chambers 200 creates a stress concentration zone in the body 165 at the interface 205 when the shear sleeve 160 is subjected to one or more stresses. The stress concentration zone may extend along the length 190 or a portion of the length 190 of the shear sleeve 160. In an exemplary embodiment, the interface 205 forms a geometry such as, for example a line, a tubular, a segment of a tubular, etc.

FIG. 5A illustrates the shear sleeve 160 in a run-in or first configuration, in which the inner portion 175 is integrally formed to the outer portion 185. In an exemplary embodiment, the shear sleeve 160 is concentrically disposed between an outer sleeve 210 and an inner sleeve 215. The shear sleeve 160 may be coupled to each of the inner sleeve 215 and the outer sleeve 210 in a variety of ways, such as for example, by a friction fit, etc. In the first configuration, the sleeve 160 withstands a predetermined range of shear forces that are applied to the shear sleeve 160 in either the direction 195B or direction 195A when the inner sleeve 215 is urged to move relative to the outer sleeve 210. As the body 165 forms both the radial portion 175 and the outer radial portion 185, the shear plug 160 is a single component shear sleeve.

FIG. 5B illustrates the shear sleeve 160 in an actuated or second configuration, in which the inner portion 175 is detached from the outer portion 185. In an exemplary embodiments, and when a shear force is applied in the axial direction (i.e., the direction 195B or direction 195A), the inner radial portion 175 is separated from the outer radial portion 185 along the interface 205. That is, when an axial force is applied to the shear sleeve 160 that results in a shear stress occurring in the interface 205 that exceeds the shear strength of the material forming the body 165, then the inner portion 175 breaks away from the outer portion 185 to allow relative movement between the inner sleeve 215 and the outer sleeve 210. In an exemplary embodiment, the sleeve 160 withstands bi-direction pressures until a predetermined shear pressure is exerted on the shear sleeve 160. Thus, the shear sleeve 160 is a bi-directional shear sleeve.

Generally, the plurality of chambers 200 is substantially identical to the plurality of chambers 135. The chambers from the plurality of chambers 200 are internal chambers, which are chambers that are spaced from an external surface 165a of the body 165 or are chambers that do not penetrate the external surface 165a. In one or more exemplary embodiment, the chambers from the plurality of chambers 200 are radially spaced and/or axially spaced along the interface 205. In one or more exemplary embodiments, the spacing of chambers from the plurality of chambers 200 in the radial and axial directions forms a chamber array. In one or more exemplary embodiments, the chambers from the plurality of chambers 200 may be spaced in a variety of arrays to form an integrally formed single-component shear sleeve 160. A portion of the shear sleeve 160 is "weakened" along the interface 205 using the plurality of chambers 200. In one or more exemplary embodiments, each of the chambers in the plurality of chambers 200 is of engineered size distribution and chamber density distribution. In an exemplary embodiment, the body 165 is a fused body formed from a fused material and the chambers from the plurality of chambers 200 are un-fused areas. In an exemplary embodiment, the chambers from the plurality of chambers 200 contain an un-fused material (they are not completely hollow). In an exemplary embodiment, the shear strength of the shear sleeve 160 is dependent upon a sectional area of an internal chamber or the sum of the sectional areas of the plurality of chambers 200 along the interface 165 or a portion of the interface 165.

Figure 6A:
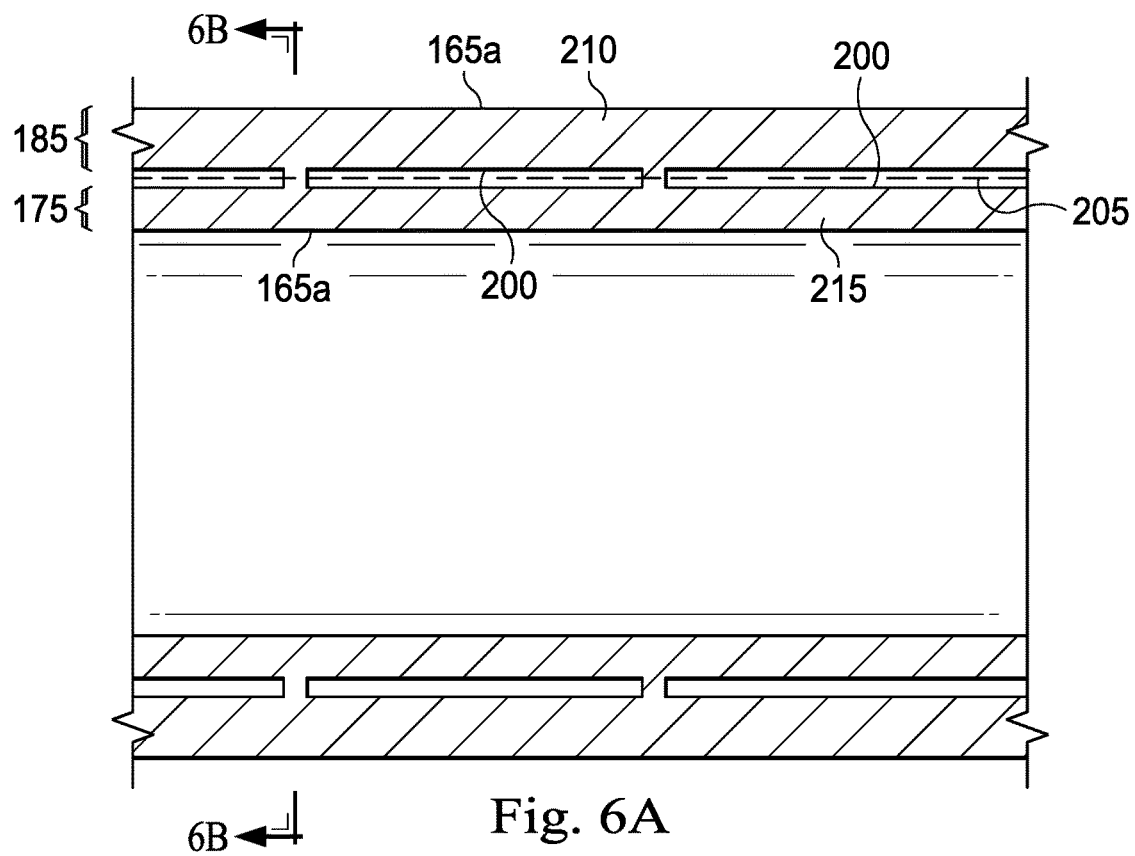
FIG. 6A is a sectional view of the shear sleeve of FIG. 4, according to another exemplary embodiment of the present disclosure.
Figure 6B:
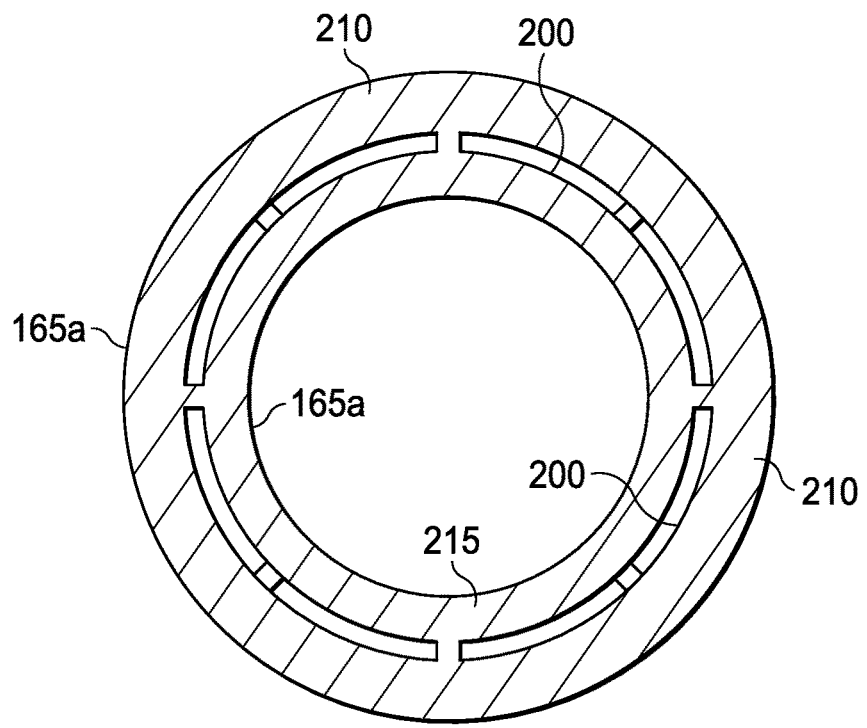
FIG. 6B is another sectional view of the shear sleeve of FIG. 6A, according to an exemplary embodiment of the present disclosure.

FIGS. 6A and 6B illustrate sectional views of the shear sleeve 160 when a chamber from the plurality of chambers 200 extends along the length 190 of the sleeve 160. In an exemplary embodiment, the portion of the body 165, or webbing, within the zone 205 may be designed to have a specific cross-sectional area to cause the webbing to be sheared or fail in tensile at a specific load. The load to shear the webbing could be hydraulically or mechanically. Moreover, although the webbing is integrally formed with the inner radial portion 175 and the outer radial portion 185, the webbing may be a different material than the material forming the inner radial portion 175 and the outer radial portion 185. In fact, the webbing may be made out of a material that is "weaker" than the material of the inner radial portion 175 and the outer radial portion 185. The webbing could be staggered across the sleeve 160 to evenly distribute the load for thin-wall parts.

In an alternate embodiment, the outer radial portion 185 is the outer sleeve 210 and the inner radial portion 175 is the inner sleeve 215.

Figure 7A:
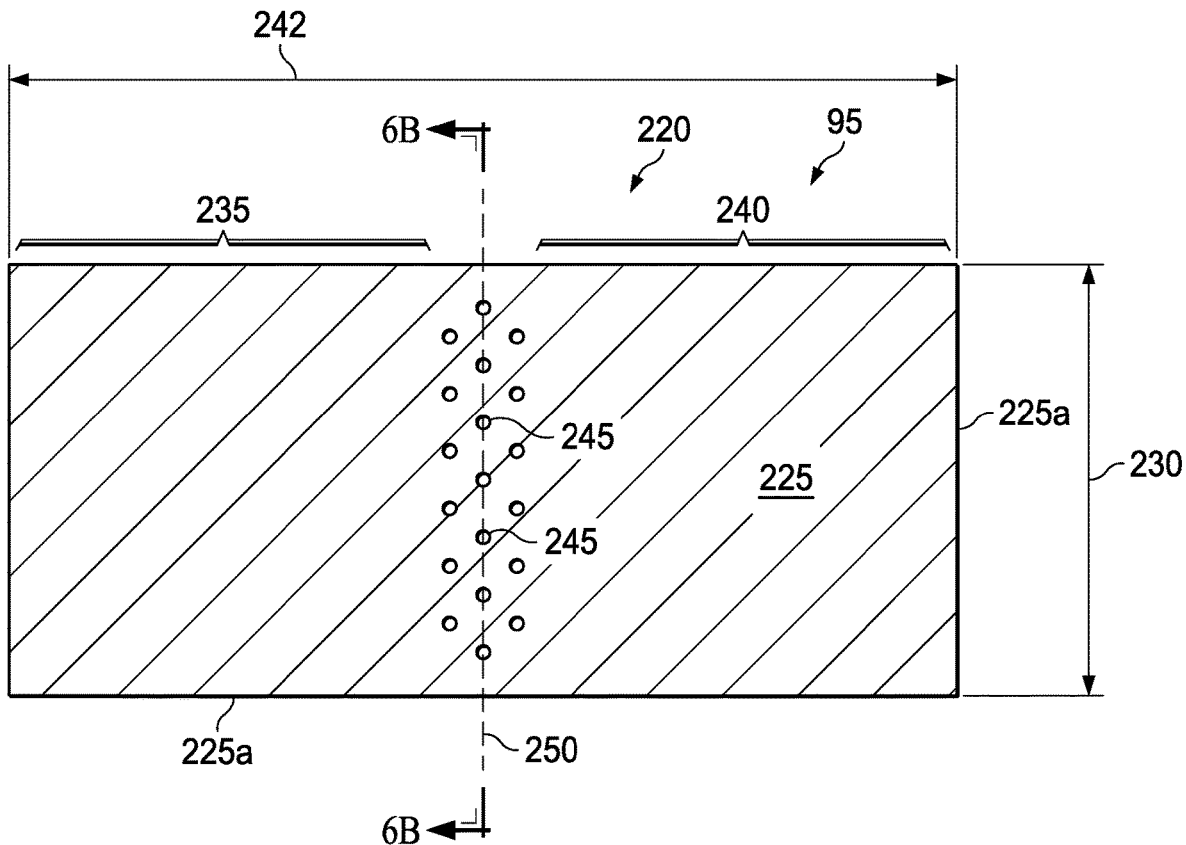
FIG. 7A is a sectional view of the tool of FIG. 1 when the tool is a shear pin, according to an exemplary embodiment of the present disclosure.
Figure 7B:
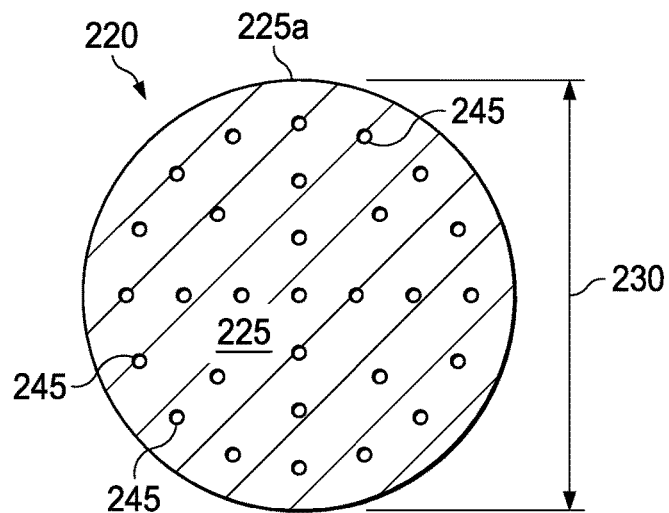
FIG. 7B is another sectional view of the pin of FIG. 7A, according to an exemplary embodiment of the present disclosure.

FIGS. 7A and 7B illustrate sectional views of the tool 95 when the tool 95 is a shear pin 220. The shear pin 220 is formed from an integrally formed body 225 that has an outer dimension 230 associated with a pin size. As shown, the shape of the cross-section of the pin 220 as shown in FIG. 7B forms a circle. However, the shape of the cross-section of the pin 220 may be any shape, such as for example a square, a hexagon or any other polygon, an oval, etc. In an exemplary embodiment, the integrally formed, single-component body 225 has a first end portion 235; a second opposing second end portion 240; and a length 242. In an exemplary embodiment, a plurality of interior chambers 245 are formed within the body 225 at an interface 250 of the first end portion 235 and the second end portion 240. In an exemplary embodiment, the interface 250 is a zone of the body 225 that is adjacent at least one internal chamber of the plurality of internal chambers 245. In an exemplary embodiment, the interface 250 forms a cylindric section, or a portion of a cylindric section, within the shear pin 220. For example, the interface 250 may form a plane that is perpendicular to a longitudinal axis of the shear pin 220. In an exemplary the plurality of chambers 245 creates a stress concentration zone in the body 225 at the interface 250 when the shear pin 220 is subjected to one or more stresses. In an exemplary embodiment, the interface 250 and therefore the stress zone forms a geometry such as, for example a line, a plane, a cylinder, a section of a cylinder etc.

Figure 8A:
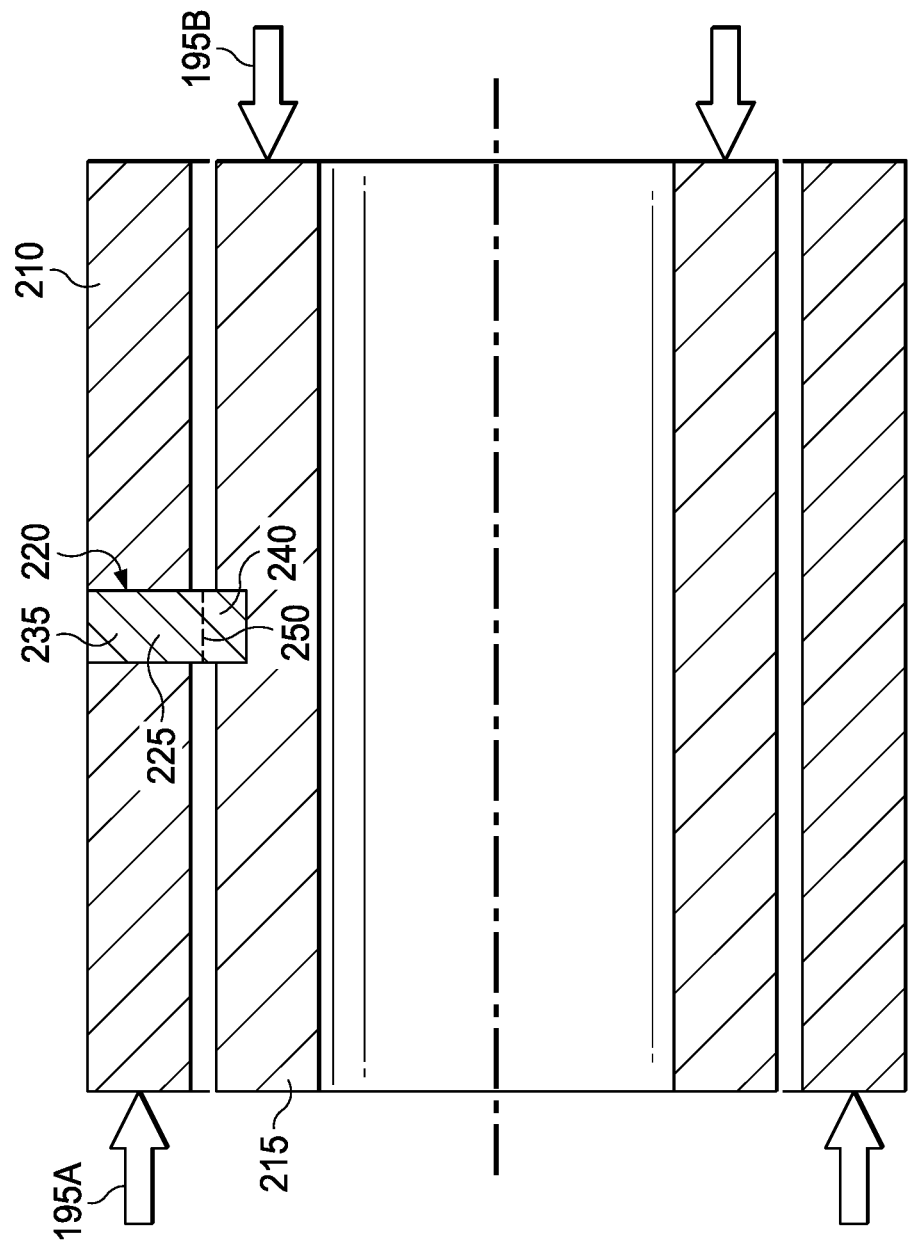
FIG. 8A is a sectional view of the shear pin of FIGS. 7A and 7B in a first configuration, according to an exemplary embodiment of the present disclosure.

FIG. 8A illustrates the shear pin 220 in a run-in or first configuration, in which the body 225 is integrally formed such that the first end portion 235 is integrally attached to the second end portion 240. In an exemplary embodiment, the first end portion 235 of the shear pin 220 is coupled to the outer sleeve 210 and the second end portion 240 of the shear pin 220 is coupled to the inner sleeve 215. The shear pin 220 may be coupled to each of the inner sleeve 215 and the outer sleeve 210 in a variety of ways, such as for example, by a friction fit, etc. In the first configuration, the pin 220 withstands a predetermined range of shear forces that are applied to the shear pin 220 in a direction that is generally perpendicular to a length 242 of the pin 220 (i.e., the direction 195B or the direction 195A), as when the inner sleeve 215 is urged to move relative to the outer sleeve 210.

Figure 8B:
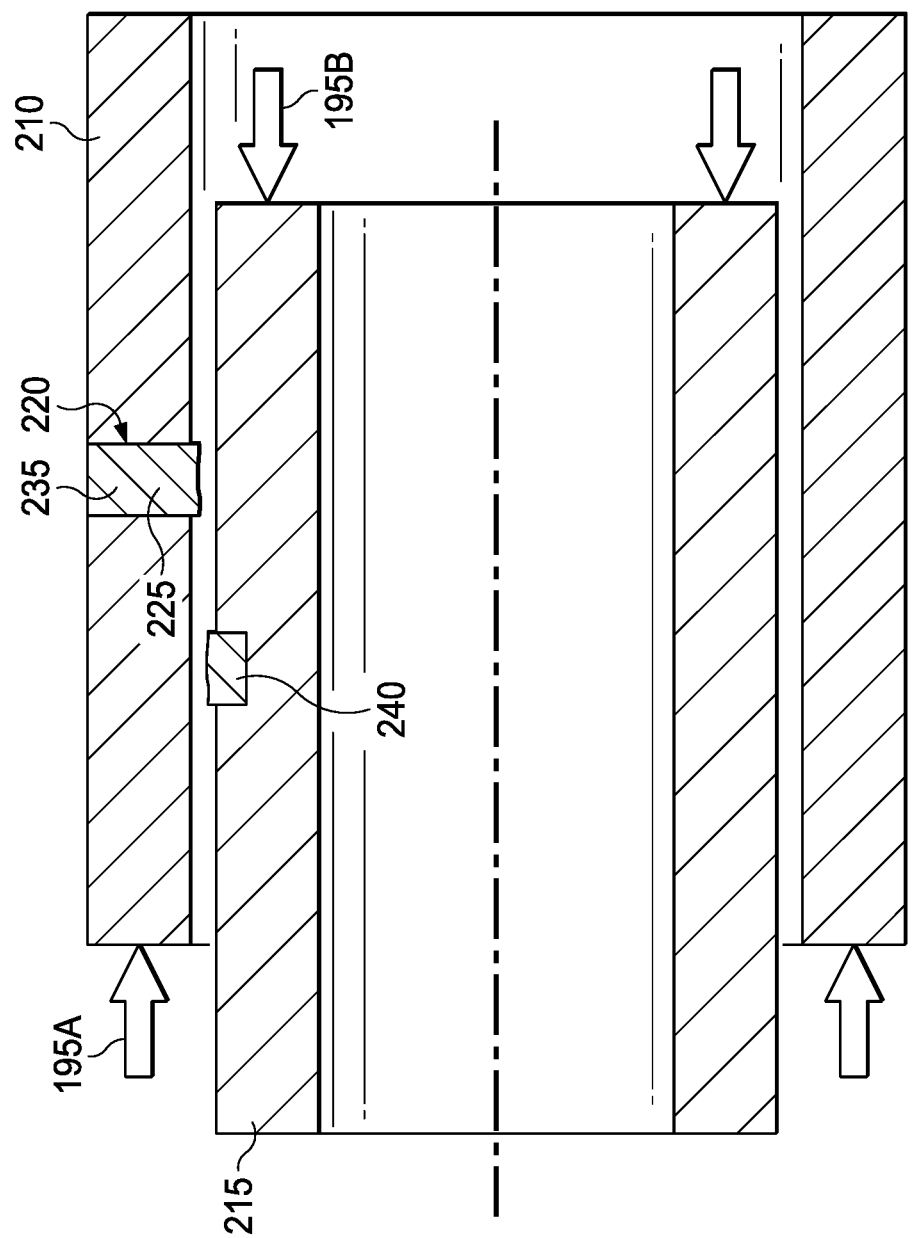
FIG. 8B is a sectional view of the shear pin of FIG. 8A in a second configuration, according to an exemplary embodiment of the present disclosure.

FIG. 8B illustrates the shear pin 220 in an actuated or second configuration, in which the first end portion 235 is detached or sheared from the second end portion 240. In an exemplary embodiment, and when a shear force is applied in the direction that is generally perpendicular to the length 242 of the pin 220 (i.e., the direction 195B or the direction 195A), the first end portion 235 is separated from the second end portion 240 along the interface 250. That is, the first end portion 235 breaks away from the second end portion 240 along the interface 250 to allow relative movement between the inner sleeve 215 and the outer sleeve 210 when a shear force is applied to the pin 220 that exceeds the shear strength of the material of the body 225.

Generally, the plurality of chambers 245 is substantially identical to the plurality of chambers 135. The chambers from the plurality of chambers 245 are internal chambers, which are chambers that are spaced from an external surface 225a of the body 225 or are chambers that do not penetrate the external surface 225a. In one or more exemplary embodiments, the chambers from the plurality of chambers 245 are radially spaced and/or axially spaced along the interface 250. In one or more exemplary embodiments, the spacing of chambers from the plurality of chambers 245 in the radial and axial directions forms a chamber array. In one or more exemplary embodiments, the chambers from the plurality of chambers 245 may be spaced in a variety of arrays to form an integrally formed single-component shear pin 220. A portion of the shear pin 220 is "weakened" along the interface 250 using the plurality of chambers 245. In one or more exemplary embodiments, each of the chambers in the plurality of chambers 245 is of engineered size distribution and chamber density distribution. In an exemplary embodiment, the body 225 is a fused body formed from a fused material and the chambers from the plurality of chambers 245 are un-fused areas. In an exemplary embodiment, the chambers from the plurality of chambers 245 contain an un-fused material (they are not completely hollow). In an exemplary embodiment, the shear strength of the shear pin 220 is dependent upon a sectional area of an internal chamber or the sum of the sectional areas of the plurality of chambers 240 along a cylindric section, or a portion of a cylindric section, within the stress zone, or along the interface 250.

Figure 9A:
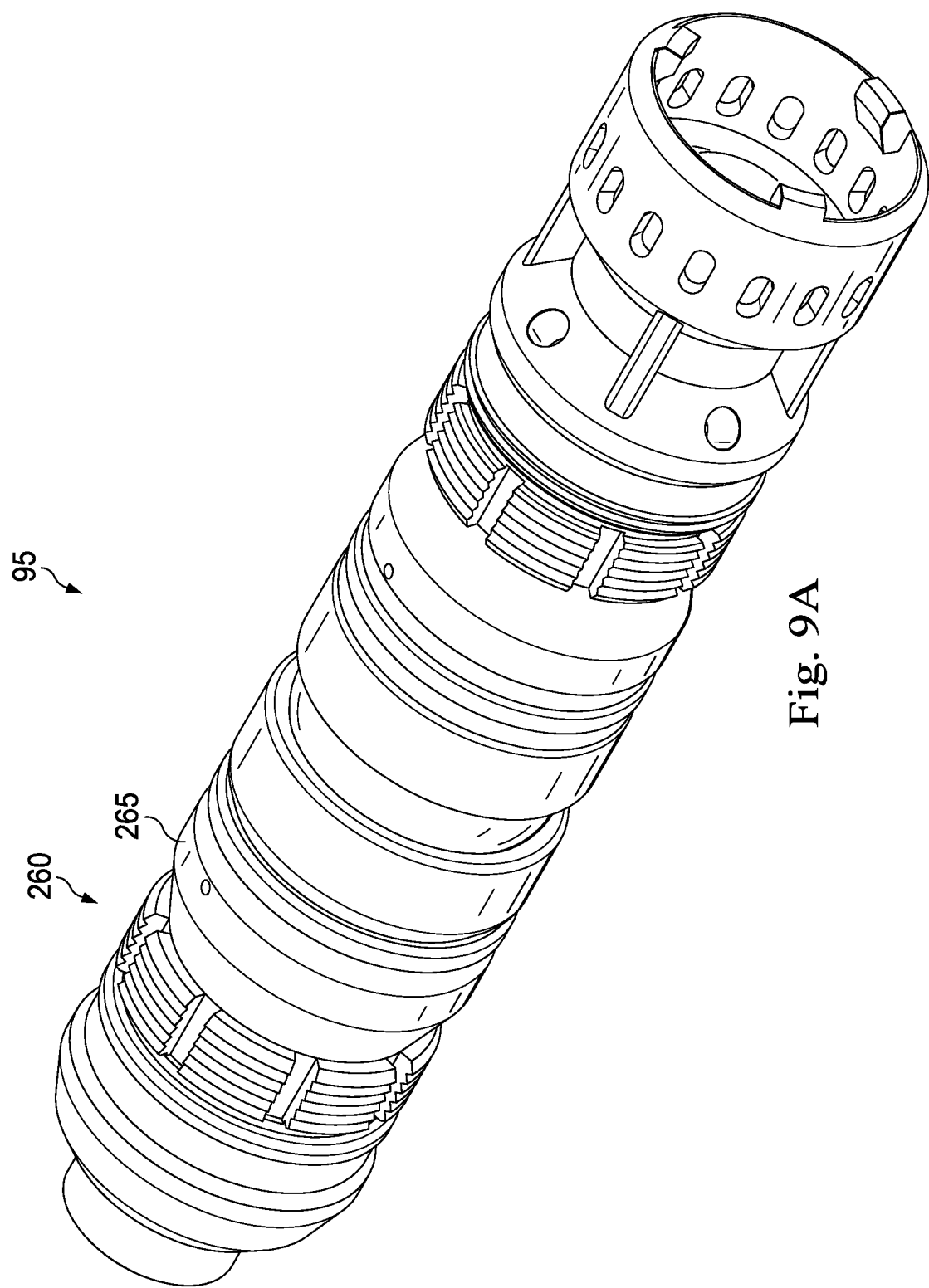
FIG. 9A illustrates a perspective view of the tool of FIG. 1 when the tool is a millable packer, according to an exemplary embodiment of the present disclosure.
Figure 9B:
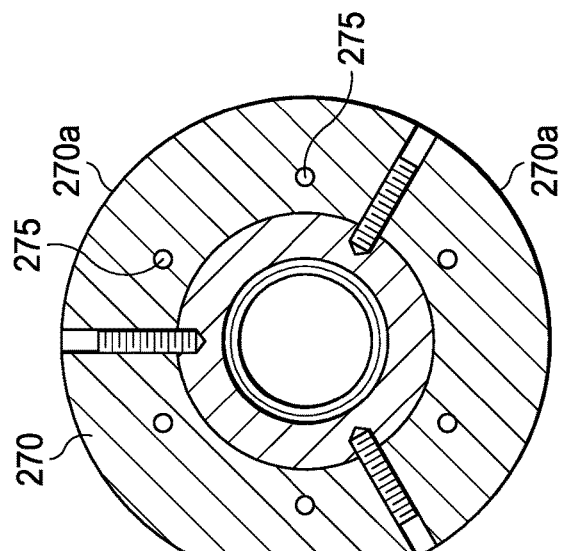
FIG. 9B is a sectional view of the tool of FIG. 9A, according to an exemplary embodiment.
Figure 9C:
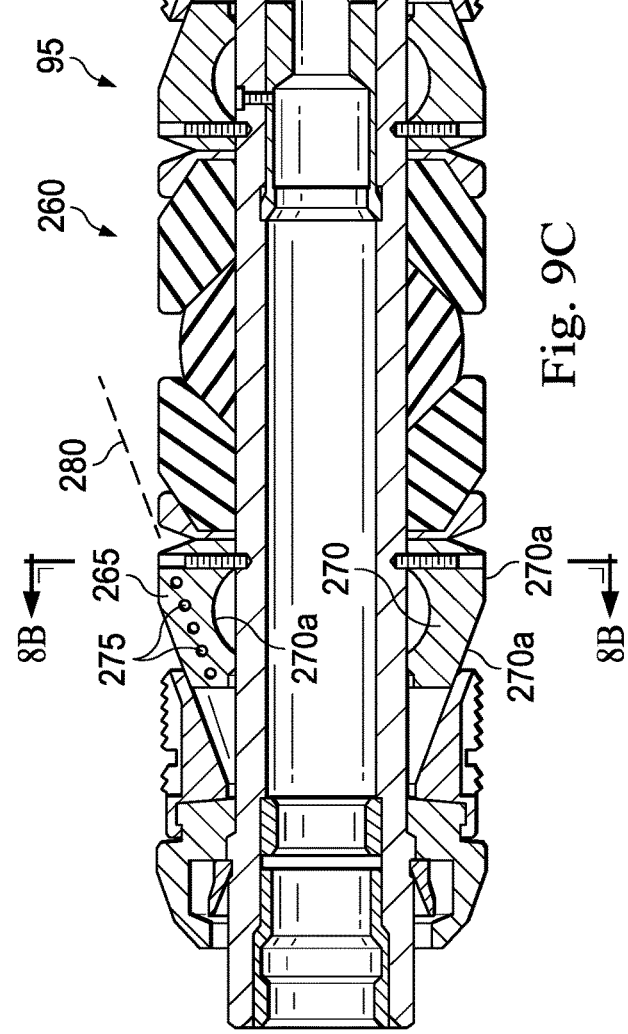
FIG. 9C is another sectional view of the tool of FIG. 9A, according to an exemplary embodiment.

FIG. 9A is a perspective view of the tool 95 when the tool is a millable tool, such as a millable packer 260. FIGS. 9B and 9C are sectional views of the millable packer 260. Generally, the millable packer 260 includes a component, such as a metal component 265. The metal component 265 may include an integrally formed, single-component body 270 forming a plurality of internal chambers 275. The plurality of internal chambers 275 is formed within the body 270 to form a release-by-milling zone 280. In an exemplary embodiment, the zone 280 forms a geometry, such as a line, a plane, an arc, a cylinder, a section of a cylinder, etc. In an exemplary embodiment, the plurality of chambers 275 creates a stress concentration zone that corresponds with the interface 280 in the body 270 such that when the millable packer 260 is milled and therefore subjected to stress (i.e., shear stress, compressive stress, or tensile stress), the body 270 breaks along the zone 280. Thus, it is easy to mill out the millable tool. While the plurality of internal chambers 275 does not reduce or affect the performance of the millable packer 260, it does result in weaker resistance during milling operations. Specifically, the compression strength of the component 265 is not changed, yet the speed of milling operations is increased and/or effort of milling operations is decreased.

Generally, the plurality of chambers 275 is substantially identical to the plurality of chambers 135. The chambers from the plurality of chambers 275 are internal chambers, which are chambers that are spaced from an external surface 270a of the body 270 or are chambers that do not penetrate the external surface 270a. In one or more exemplary embodiments, the chambers from the plurality of chambers 275 are radially spaced and/or axially spaced along the zone 280. In one or more exemplary embodiments, the spacing of chambers from the plurality of chambers 275 in the radial and axial directions forms a chamber array. A portion of the body 270 is "weakened" along the zone 280 using the plurality of chambers 275. In one or more exemplary embodiments, each of the chambers in the plurality of chambers 275 is of engineered size distribution and chamber density distribution. In an exemplary embodiment, the body 270 is a fused body formed from a fused material and the chambers from the plurality of chambers 275 are un-fused areas. In an exemplary embodiment, the chambers from the plurality of chambers 275 contain an un-fused material (they are not completely hollow). In an exemplary embodiment, the shear strength of the component is dependent upon a sectional area of an internal chamber or the sum of the sectional areas of the plurality of chambers 275 along the zone 280 or a portion of the zone 280.

Exemplary embodiments of the present disclosure may be altered in a variety of ways. For example, the component 265 may form any number of tools, such as for example, a millable plug, a millable valve, etc. Additionally, the tool 95 is not limited to the plug 100, the sleeve 160, the pin 220, and the millable tool 260, but can be any tool or tool component that is designed to have a first configuration in which relative movement between two components is prevented and a second configuration in which relative movement between the two components is desired. Additionally, when in the first configuration the tool 95, and considering the body is integrally formed, the tool 95 forms a pressure seal. The reduction of components simplifies manufacture of the tool 95 and reduces cost associated with the manufacture of the tool 95. Moreover, the reduction of components simplifies, reduces, or eliminates assembly of the tool 95 or of a tool that uses the tool 95 in the field, which may reduce or eliminate assembly errors made in the field.

Figure 10:
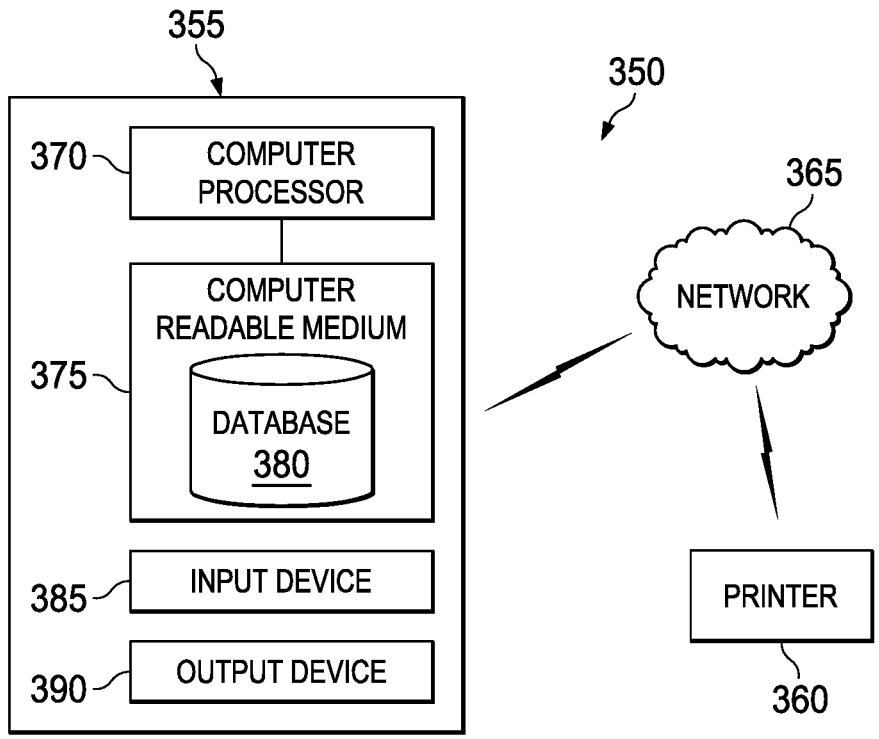
FIG. 10 illustrates an additive manufacturing system, according to an exemplary embodiment.

In an exemplary embodiment and as shown in FIG. 10, a down-hole tool printing system 350 includes one or more computers 355 and a printer 360 that are operably coupled together, and in communication via a network 365. In one or more exemplary embodiments, the tool 95 may be manufactured using the downhole tool printing system 350. In one or more exemplary embodiments, the one or more computers 355 include a computer processor 370 and a computer readable medium 375 operably coupled thereto. In one or more exemplary embodiments, the computer processor 370 includes one or more processors. Instructions accessible to, and executable by, the computer processor 370 are stored on the computer readable medium 375. A database 380 is also stored in the computer readable medium 375. In one or more exemplary embodiments, the computer 355 also includes an input device 385 and an output device 390. In one or more exemplary embodiments, web browser software is stored in the computer readable medium 375. In one or more exemplary embodiments, three dimensional modeling software is stored in the computer readable medium. In one or more exemplary embodiments, software that includes advanced numerical methods for topology optimization, which assists in determining optimum chamber shape, chamber size distribution, and chamber density distribution or other topological features in the tool 95, is stored in the computer readable medium. In one or more exemplary embodiments, software involving finite element analysis and topology optimization is stored in the computer readable medium 375. In one or more exemplary embodiments, any one or more constraints are entered in the input device 385 such that the software aids in the design on a tool 95 in which specific portions of the body of the tool 95 remain solid (i.e., no chambers are formed). In one or more exemplary embodiments, the input device 385 is a keyboard, mouse, or other device coupled to the computer 355 that sends instructions to the computer 355. In one or more exemplary embodiments, the input device 385 and the output device 390 include a graphical display, which, in several exemplary embodiments, is in the form of, or includes, one or more digital displays, one or more liquid crystal displays, one or more cathode ray tube monitors, and/or any combination thereof. In one or more exemplary embodiments, the output device 390 includes a graphical display, a printer, a plotter, and/or any combination thereof. In one or more exemplary embodiments, the input device 385 is the output device 390, and the output device 390 is the input device 385. In several exemplary embodiments, the computer 355 is a thin client. In several exemplary embodiments, the computer 355 is a thick client. In several exemplary embodiments, the computer 355 functions as both a thin client and a thick client. In several exemplary embodiments, the computer 355 is, or includes, a telephone, a personal computer, a personal digital assistant, a cellular telephone, other types of telecommunications devices, other types of computing devices, and/or any combination thereof. In one or more exemplary embodiments, the computer 355 is capable of running or executing an application. In one or more exemplary embodiments, the application is an application server, which in several exemplary embodiments includes and/or executes one or more web-based programs, Intranet-based programs, and/or any combination thereof. In one or more exemplary embodiments, the application includes a computer program including a plurality of instructions, data, and/or any combination thereof. In one or more exemplary embodiments, the application written in, for example, HyperText Markup Language (HTML), Cascading Style Sheets (CSS), JavaScript, Extensible Markup Language (XML), asynchronous JavaScript and XML (Ajax), and/or any combination thereof.

In one or more exemplary embodiments, the printer 360 is a three-dimensional printer. In one or more exemplary embodiments, the printer 360 includes a layer deposition mechanism for depositing material in successive adjacent layers; and a bonding mechanism for selectively bonding one or more materials deposited in each layer. In one or more exemplary embodiments, the printer 360 is arranged to form a unitary printed body by depositing and selectively bonding a plurality of layers of material one on top of the other. In one or more exemplary embodiments, the printer 360 is arranged to deposit and selectively bond two or more different materials in each layer, and wherein the bonding mechanism includes a first device for bonding a first material in each layer and a second device, different from the first device, for bonding a second material in each layer. In one or more exemplary embodiments, the first device is an ink jet printer for selectively applying a solvent, activator or adhesive onto a deposited layer of material. In one or more exemplary embodiments, the second device is a laser for selectively sintering material in a deposited layer of material. In one or more exemplary embodiments, the layer deposition means includes a device for selectively depositing at least the first and second materials in each layer. In one or more exemplary embodiments, any one of the two or more different materials may be ABS plastic, PLA, polyamide, glass filled polyamide, stereolithography materials, silver, titanium, steel, wax, photopolymers, polycarbonate, and a variety of other materials. In one or more exemplary embodiments, the printer 360 may involve fused deposition modeling, selective laser sintering, and/or multi-jet modeling. In operation, the computer processor 370 executes a plurality of instructions stored on the computer readable medium 375. As a result, the computer 355 communicates with the printer 360, causing the printer 360 to manufacture the tool 95 or at least a portion thereof. In one or more exemplary embodiments, manufacturing the tool 95 using the system 350 results in an integrally formed tool 95.

Figure 11:
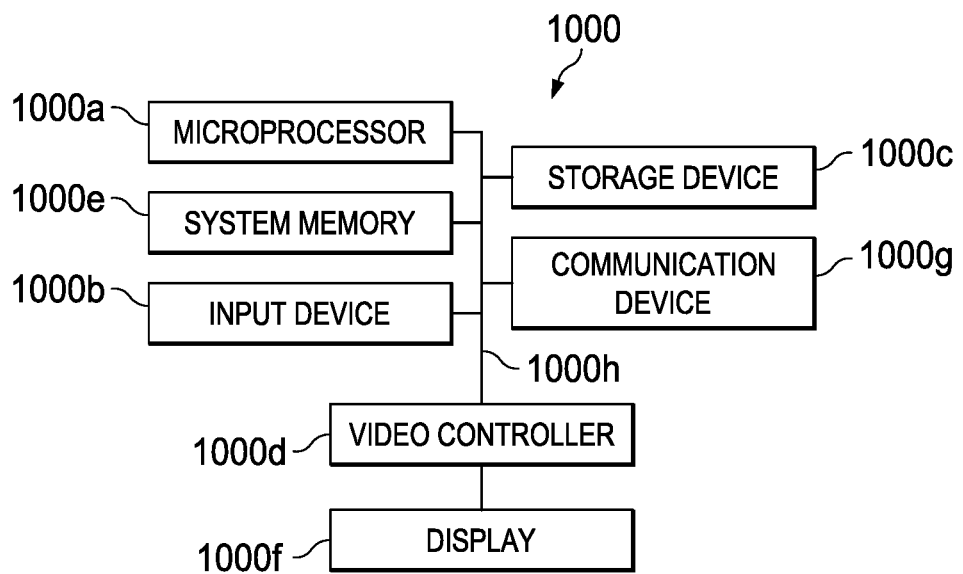
FIG. 11 is a diagrammatic illustration of a node for implementing one or more exemplary embodiments of the present disclosure, according to an exemplary embodiment.

In one or more exemplary embodiments, as illustrated in FIG. 11 with continuing reference to FIGS. 1, 2, 3A, 3B, 4, 5A, 5B, 6A, 6B, 7A, 7B 8A, 8B, 9A, 9B, 9C, and 10, an illustrative computing device 1000 for implementing one or more embodiments of one or more of the above-described networks, elements, methods and/or steps, and/or any combination thereof, is depicted. The computing device 1000 includes a processor 1000*a*, an input device 1000*b*, a storage device 1000*c*, a video controller 1000*d*, a system memory 1000*e*, a display 1000*f*, and a communication device 1000*g*, all of which are interconnected by one or more buses 1000*h*. In several exemplary embodiments, the storage device 1000*c* may include a floppy drive, hard drive, CD-ROM, optical drive, any other form of storage device and/or any combination thereof. In several exemplary embodiments, the storage device 1000*c* may include, and/or be capable of receiving, a floppy disk, CD-ROM, DVD-ROM, or any other form of computer readable medium that may contain executable instructions. In one or more exemplary embodiments, the computer readable medium is a non-transitory tangible media. In several exemplary embodiments, the communication device 1000*g* may include a modem, network card, or any other device to enable the computing device 1000 to communicate with other computing devices. In several exemplary embodiments, any computing device represents a plurality of interconnected (whether by intranet or Internet) computer systems, including without limitation, personal computers, mainframes, PDAs, smartphones and cell phones.

In several exemplary embodiments, the one or more computers 355, the printer 360, and/or one or more components thereof, are, or at least include, the computing device 1000 and/or components thereof, and/or one or more computing devices that are substantially similar to the computing device 1000 and/or components thereof. In several exemplary embodiments, one or more of the above-described components of one or more of the computing device 1000, one or more computers 355, and the printer 360 and/or one or more components thereof, include respective pluralities of same components.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a computing device such as, for example, on a client machine or server.

In several exemplary embodiments, combinations of software and hardware could also be used for providing enhanced functionality and performance for certain embodiments of the present disclosure. In one or more exemplary embodiments, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In one or more exemplary embodiments, a data structure may provide an organization of data, or an organization of executable code.

In several exemplary embodiments, the network 365, and/or one or more portions thereof, may be designed to work on any specific architecture. In one or more exemplary embodiments, one or more portions of the network 365 may be executed on a single computer, local area networks, client-server networks, wide area networks, internets, hand-held and other portable and wireless devices and networks.

In several exemplary embodiments, a database may be any standard or proprietary database software, such as Oracle, Microsoft Access, SyBase, or DBase II, for example. In several exemplary embodiments, the database may have fields, records, data, and other database elements that may be associated through database specific software. In several exemplary embodiments, data may be mapped. In several exemplary embodiments, mapping is the process of associating one data entry with another data entry. In one or more exemplary embodiments, the data contained in the location of a character file can be mapped to a field in a second table. In several exemplary embodiments, the physical location of the database is not limiting, and the database may be distributed. In one or more exemplary embodiments, the database may exist remotely from the server, and run on a separate platform. In one or more exemplary embodiments, the database may be accessible across the Internet. In several exemplary embodiments, more than one database may be implemented.

In several exemplary embodiments, a computer program, such as a plurality of instructions stored on a computer readable medium, such as the computer readable medium 375, the system memory 1000e, and/or any combination thereof, may be executed by a processor to cause the processor to carry out or implement in whole or in part the operation of the system 350, and/or any combination thereof. In several exemplary embodiments, such a processor may include one or more of the computer processor 370, the processor 1000a, and/or any combination thereof. In several exemplary embodiments, such a processor may execute the plurality of instructions in connection with a virtual computer system.

In several exemplary embodiments, a plurality of instructions stored on a computer readable medium may be executed by one or more processors to cause the one or more processors to carry out or implement in whole or in part the above-described operation of each of the above-described exemplary embodiments of the system, the method, and/or any combination thereof. In several exemplary embodiments, such a processor may include one or more of the microprocessor 1000a, any processor(s) that are part of the components of the system, and/or any combination thereof, and such a computer readable medium may be distributed among one or more components of the system. In several exemplary embodiments, such a processor may execute the plurality of instructions in connection with a virtual computer system. In several exemplary embodiments, such a plurality of instructions may communicate directly with the one or more processors, and/or may interact with one or more operating systems, middleware, firmware, other applications, and/or any combination thereof, to cause the one or more processors to execute the instructions.

In one or more exemplary embodiments, the instructions may be generated, using in part, advanced numerical method for topology optimization to determine optimum chamber shape, chamber size and distribution, and chamber density distribution for the plurality of chambers 135, 200, 245, and/or 275, or other topological features.

During operation of the system 350, the computer processor 370 executes the plurality of instructions that causes the manufacture of the tool 95 using additive manufacturing. Thus, the tool 95 is at least partially manufactured using an additive manufacturing process. Manufacturing the tool 95 via machining forged billet stock or using multi-axis milling processes often limits the geometries and design of the tool 95. Thus, with additive manufacturing, complex geometries—such as internal chambers 135, 200, 245, and/or 275—are achieved or allowed, which results in the creation of stress concentration zones within the tool 95. In one or more exemplary embodiments, the use of three-dimensional, or additive, manufacturing to manufacture downhole equipment, such as the tool 95, will allow increased flexibility in the strategic placement of material to retain strength in one direction but reduce strength, or weaken the tool in another direction.

Thus, a subsurface tool adapted to extend within a wellbore has been described. Embodiments of the tool may generally include an integrally formed single-component body that defines an external surface; and an internal chamber isolated from the external surface, wherein, when the tool is subjected to one or more stresses, a stress concentration is created within a stress zone of the single-component body, the stress zone being adjacent the internal chamber.

Additionally, an apparatus has been described. Embodiments of the apparatus may generally include a non-transitory computer readable medium; and a plurality of instructions stored on the non-transitory computer readable medium and executable by one or more processors, the plurality of instructions including instructions that cause the manufacture of a subsurface tool adapted to extend within a wellbore, the tool includes an integrally formed single-component body that defines: an external surface; and an internal chamber isolated from the external surface; when the tool is subjected to one or more stresses, a stress concentration is created within a stress zone of the single-component body, the stress zone being adjacent the internal chamber. Any of the foregoing embodiments may include any one of the following elements, alone or in combination with each other:

The tool is a millable packer; and the stress zone extends within a release-by-milling zone.

The tool is a bi-directional pressure plug having a first configuration in which the body of the plug integrally forms a tubular portion that defines an interior passage; and a plug portion connected to the tubular to form an interface therebetween, the plug portion extending across the interior passage; wherein the stress zone extends within the body at the interface; and a second configuration in which the plug portion is not connected to the tubular at the interface.

The tool is a bi-direction pressure plug having a second configuration in which the plug portion is separated from the tubular portion.

The bi-directional pressure plug is a single-component, bi-directional pressure plug.

The subsurface tool is a shear annular element having a first configuration in which the body of the shear annular element defines an outer diameter that at least partially defines an outer radial portion; an inner diameter that at least partially defines an inner radial portion; and an axial length, wherein a stress zone extends between the inner radial portion and the outer radial portion along at least a portion of the axial length of the body.

The shear annular element has a second configuration in which the inner radial portion is sheared from the outer radial portion along the stress zone.

The shear annular element is a single-component shear sleeve.

The tool is a shear pin having a first configuration in which the body forms a first end portion; and a second opposing end portion, with the stress zone extending between the first end portion and the second end portion; and a second configuration in which the first end portion is sheared from the second end portion.

The shear strength of the shear pin is dependent upon a sectional area of the internal chamber along a portion of a cylindric section within the stress zone.

The tool is at least partially manufactured using an additive manufacturing process.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures. In several exemplary embodiments, one or more of the operational steps in each embodiment may be omitted. Moreover, in some instances, some features of the present disclosure may be employed without a corresponding use of the other features. Although various embodiments and methods have been shown and described, the disclosure is not limited to such embodiments and methods and will be understood to include all modifications and variations as would be apparent to one skilled in the art. Therefore, it should be understood that the disclosure is not intended to be limited to the particular forms disclosed. Accordingly, the intention is to cover all modifications, equivalents and alternatives falling within the spirit and scope of the disclosure as defined by the appended claims. The foregoing description and figures are not drawn to scale, but rather are illustrated to describe various embodiments of the present disclosure in simplistic form.

What is claimed is:

1. A subsurface tool adapted to extend within a wellbore, comprising:
   an integrally formed single-component body that defines an external surface; and
   an internal chamber fully isolated within a wall thickness of the single-component body and isolated from the external surface;
   wherein, when the tool is subjected to one or more stresses, a stress concentration is created within a stress zone of the single-component body, the stress zone being adjacent the internal chamber.

2. The tool of claim 1,
   wherein the tool is a millable packer; and
   wherein the stress zone extends within a release-by-milling zone.

3. The tool of claim 1, wherein the tool is a bi-directional pressure plug having:
   a first configuration in which the body of the plug integrally forms:
      a tubular portion that defines an interior passage; and
      a plug portion connected to the tubular to form an interface therebetween, the plug portion extending across the interior passage;

wherein the stress zone extends within the body at the interface; and a second configuration in which the plug portion is not connected to the tubular at the interface.

4. The tool of claim 3, wherein the bi-directional pressure plug is a single-component, bi-directional pressure plug.

5. The tool of claim 1, wherein the subsurface tool is a shear annular element having a first configuration in which the body of the shear annular element defines:

an outer diameter that at least partially defines an outer radial portion;

an inner diameter that at least partially defines an inner radial portion; and an axial length;

wherein the stress zone extends between the inner radial portion and the outer radial portion along at least a portion of the axial length of the body.

6. The tool of claim 5, wherein the shear annular element has a second configuration in which the inner radial portion is sheared from the outer radial portion along the stress zone.

7. The tool of claim 5, wherein the shear annular element is a single-component shear sleeve.

8. The tool of claim 1, wherein the tool is a shear pin having:

a first configuration in which the body forms:

a first end portion; and a second opposing end portion connected to the first end portion to form an interface therebetween, wherein the stress zone extends within the body at the interface;

and a second configuration in which the first end portion is not connected to the second opposing end portion at the interface.

9. The tool of claim 1, wherein:

the tool is a shear pin; and a shear strength of the shear pin is dependent upon a sectional area of the internal chamber along a portion of a cylindric section within the stress zone.

10. The tool of claim 1, wherein the tool is at least partially manufactured using an additive manufacturing process.

* * * * *